(12) United States Patent
Lim

(10) Patent No.: US 10,254,577 B2
(45) Date of Patent: Apr. 9, 2019

(54) ELECTRONIC PANEL HAVING A SEE-THROUGH MODE

(71) Applicant: Lim Industries LLC, Oswego, NY (US)

(72) Inventor: Kevin J. Lim, Oswego, NY (US)

(73) Assignee: Lim Industries LLC, Oswego, NY (US)

( * ) Notice: Subject to any disclaimer, the term of this patent is extended or adjusted under 35 U.S.C. 154(b) by 312 days.

(21) Appl. No.: 15/019,596

(22) Filed: Feb. 9, 2016

(65) Prior Publication Data

US 2017/0227818 A1 Aug. 10, 2017

(51) Int. Cl.
G02F 1/1335 (2006.01)
G02F 1/13357 (2006.01)

(52) U.S. Cl.
CPC ...... *G02F 1/133509* (2013.01); *G02F 1/1336* (2013.01); *G02F 2001/133614* (2013.01)

(58) Field of Classification Search
CPC combination set(s) only.
See application file for complete search history.

(56) References Cited

U.S. PATENT DOCUMENTS

| | | | |
|---|---|---|---|
| 5,903,329 A | 5/1999 | Yoshida et al. | |
| 5,926,239 A | 7/1999 | Kumar et al. | |
| 6,986,581 B2 | 1/2006 | Sun et al. | |
| 7,514,859 B2 | 4/2009 | Naberhuis et al. | |
| 8,125,145 B2 | 2/2012 | Fiebranz | |
| 8,638,411 B2 | 1/2014 | Park et al. | |
| 9,007,277 B2 | 4/2015 | Fleck | |
| 2003/0122771 A1* | 7/2003 | Sumiyoshi | G02F 1/133621 345/102 |
| 2005/0007517 A1 | 1/2005 | Anandan | |
| 2006/0109397 A1 | 5/2006 | Anandan | |
| 2007/0057881 A1 | 3/2007 | Yu et al. | |
| 2008/0158480 A1 | 7/2008 | Ii et al. | |
| 2009/0067156 A1 | 3/2009 | Bonnett et al. | |
| 2012/0105306 A1* | 5/2012 | Fleck | G06F 1/1643 345/1.1 |
| 2012/0162269 A1* | 6/2012 | Bohn | G02B 26/005 345/690 |
| 2014/0078089 A1 | 3/2014 | Lee et al. | |

(Continued)

FOREIGN PATENT DOCUMENTS

| | | |
|---|---|---|
| DE | 102008060122 A1 | 10/2010 |
| EP | 2128845 A1 | 12/2009 |
| EP | 2047324 B1 | 2/2012 |

(Continued)

OTHER PUBLICATIONS

Prodisplay, "LCD Glass and LCD Film", <http://prodisplay.com/wp-content/uploads/lcd-glass-film-brochure.pdf>, on or before Aug. 7, 2015, 5 pages.

(Continued)

*Primary Examiner* — Lauren Nguyen
(74) *Attorney, Agent, or Firm* — Barclay Damon LLP

(57) ABSTRACT

An electronic panel has, in an embodiment, a front layer, a liquid crystal display device located behind the front layer, a lighting device located behind the liquid crystal display device, a back layer and a frame. The electronic panel also has at least one processor operable to control a plurality of viewing modes.

20 Claims, 11 Drawing Sheets

(56) References Cited

U.S. PATENT DOCUMENTS

2014/0293179 A1    10/2014    Kashima

FOREIGN PATENT DOCUMENTS

EP          2711826 A1    3/2014
KR        2014006252      1/2014
WO         9108508 A1     6/1991

OTHER PUBLICATIONS

Samsung, "Samsung Transparent OLED", on or before Jun. 29, 2015, 1 page.
MIT, "Method and Apparatus for Transparent Display Using Up-Converting Nanoparticles", <https://web.archive.org/web/20151019130210/http://technology.mit.edu/technologies/16097_methods-and-apparatus-for-transparent-display-using-up-converting-nanoparticles>, Oct. 19, 2015, 3 pages.
NXP founded by PHILIPS, "Introduction to Graphics and PCD Technologies", <https://web.archive.org/web/20150405065558/http://www.nxp.com/wcm_documents/techzones/microcontrollers-techzone/Presentations/graphics.lcd.technologies.pdf>, Apr. 5, 2015, 34 pages.
CES, "Samsung's Smart Window", <https://www.youtube.com/watch?v=m5rlTrdF5Cs>, Jan. 12, 2012, 3 pages.
Aaron Tilley, "Smart Window Maker View Raises $150 Million", <http://www.forbes.com/sites/aarontilley/2015/08/13/smart-glass-maker-view-raises-150-million/>, Aug. 13, 2015, 2 pages.
Toppan, "Color Filters for LCDs", <http://www.toppan.co.jp/electronics/english/display/lcd/>, on or before Feb. 8, 2016, 3 pages.
Hideo Fujikake, "Advanced Flexible Liquid-Crystal Display Technologies", <http://spie.org/x31616.xml>, SPIE 2008, on or before Dec. 31, 2008, 3 pages.

* cited by examiner

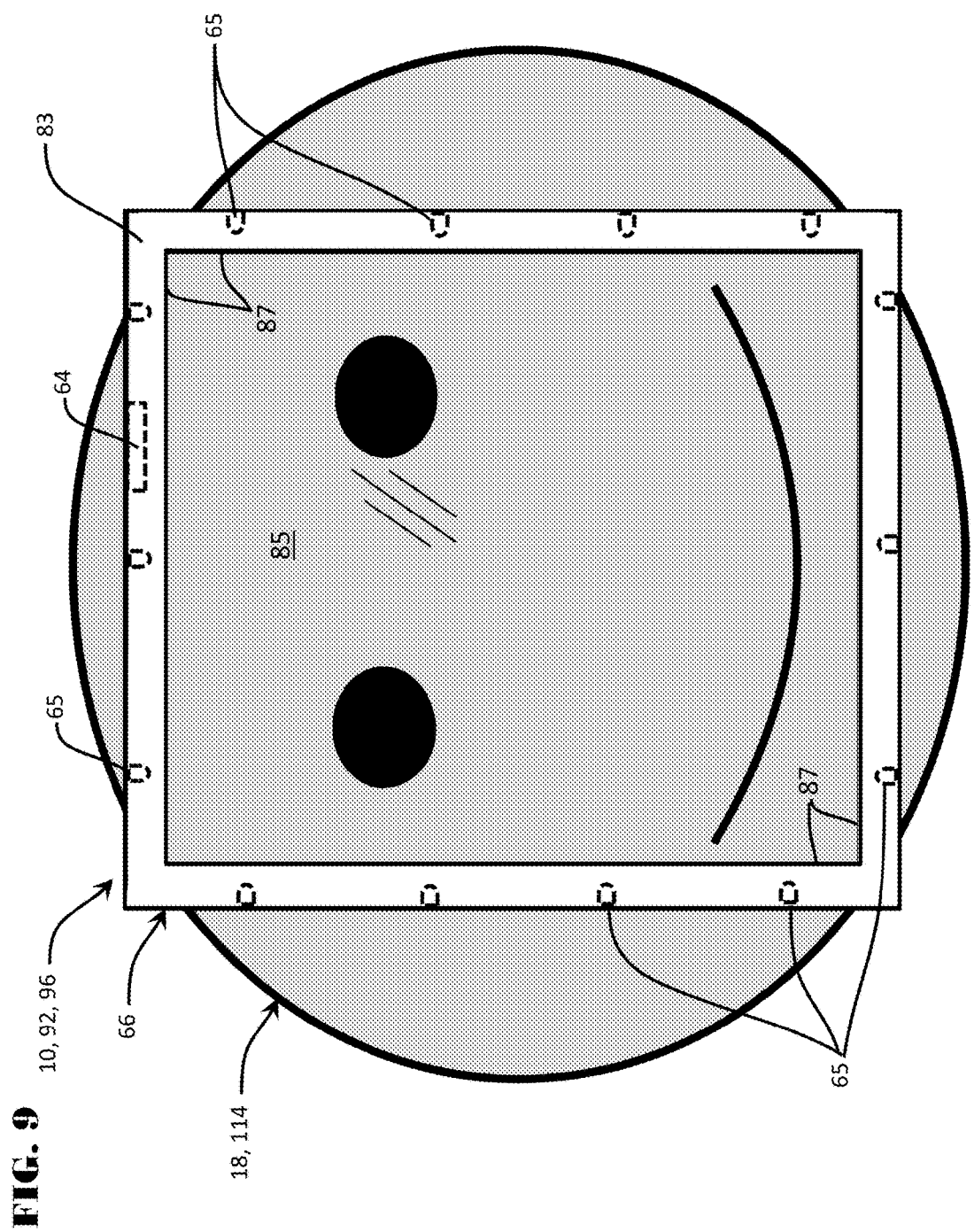

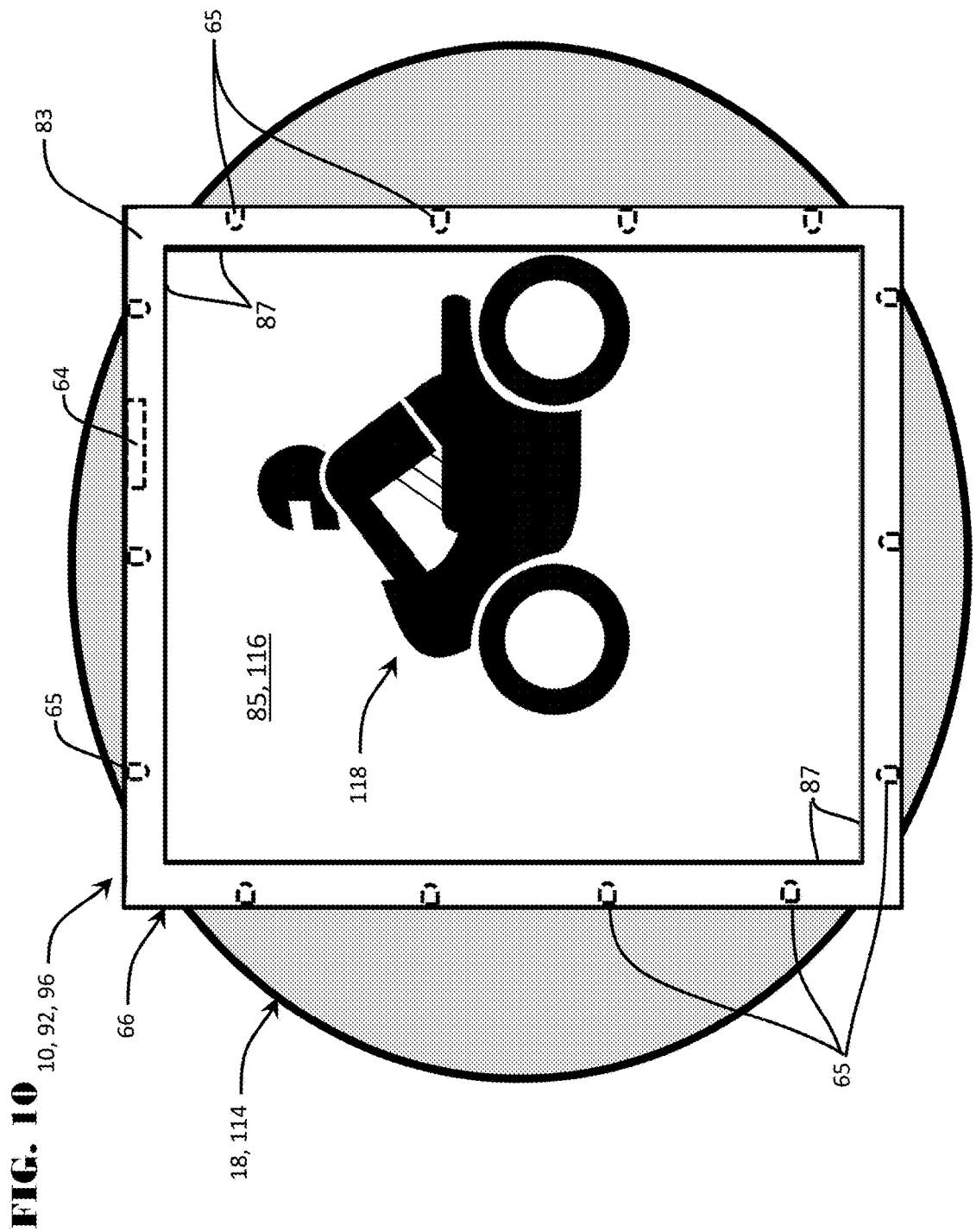

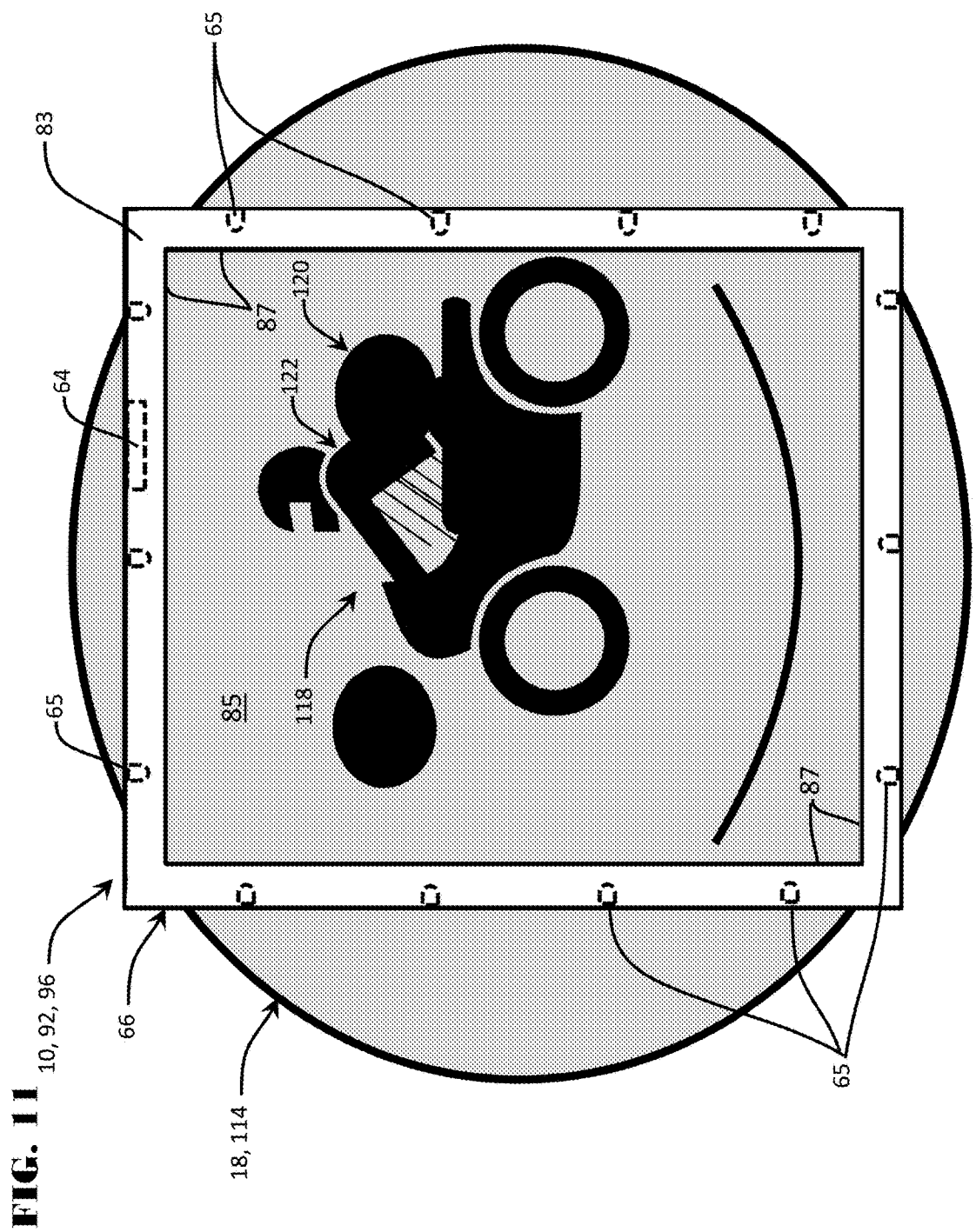

ELECTRONIC PANEL HAVING A SEE-THROUGH MODE

BACKGROUND

Display monitors enable people to view images generated by electronic devices. Individuals and businesses rely heavily on electronic images for business operations, information, socialization and entertainment. This mainstream reliance and demand for images continues to grow at a rapid pace.

In response, there has been a mass adoption of electronic devices of various types, including outdoor flat monitors, wall-mounted televisions, computers and mobile devices, such as smartphones and tablets. It is common for a home to have several wall-mounted, flat screen televisions, several computers and a smartphone for each household member. It is also common for facilities, such as manufacturing plants, central command centers and hospitals, to have arrays of wall-mounted monitors for use by employees. Furthermore, it is common for downtown city areas to have numerous, outdoor flat monitors mounted to the outsides of commercial buildings. These outdoor monitors display advertisements and entertaining graphics.

There is substantial, financial cost caused by the complexity of having to procure, install, use, manage and support so many different types of electronic devices. The complexity of having to use many different types of devices can also cause emotional stress to the end users.

An attempt has been made to consolidate display functions on a common, known medium, window glass. There is a known type of window liquid crystal display (LCD) glass that incorporates an LCD unit. The user can control the LCD glass to switch between an opaque mode and a transparent mode. However, the LCD glass is not operable to suitably generate images which are viewable. This is because the LCD glass does not incorporate a backlight device necessary to properly illuminate the LCD unit. Adding a backlight device and backlight diffuser would destroy the transparency of the LCD glass. Consequently, the user must use an additional, external device to provide illumination for an image to complement the LCD glass. Therefore, it is relatively expensive and costly to use the LCD glass as a monitor. Furthermore, having to mount, adjust and maintain the external devices can cause reliability problems, labor burdens and costs.

For a monitor, itself, to serve as a building window, it must be transparent. There are known monitors which are partially transparent. One such monitor has a transparent organic light emitting diode (OLED) module. The OLED module can provide transparency in one mode and generate a visible image in another mode. Another known monitor has a clear layer of plastic embedded with nanoparticles. This monitor has a laser generator which can direct a laser beam at each separate nanoparticle. This causes the nanoparticles to emit light for generating a visible image. However, these known monitors require control of the discrete image-generating elements, the OLED pixels and the nanoparticles. This level of discrete control consumes a relatively high amount of processing power and requires relatively complex electronics, such as the OLED technology and the laser beam generator. This demand for power and complexity can make it relatively expensive and burdensome to procure, install and maintain these type of monitors. Also, the relative high complexity makes these monitors prone to breakdowns and subject to reliability problems. For these reasons, attempting to use these types of monitors as building windows would be a relatively high risk effort with burdensome costs and technical disadvantages.

The foregoing background describes some, but not necessarily all, of the problems, disadvantages and shortcomings related to the known LCD glass and monitors having transparency.

SUMMARY

The electronic panel, in an embodiment, includes: (a) a front layer having a front surface positionable to face toward a first environment; and (b) an LCD located behind the front layer. The LCD is associated with an image display area. The electronic panel also includes: (a) a luminescent layer located behind the LCD; and (b) a light filter layer located behind the luminescent layer. The light filter layer is configured to prevent ultraviolet light from passing from a second environment through the light filter layer. Also, the electronic panel includes: (a) at least one radiator operable to radiate ultraviolet light; (b) a frame which supports the front layer, the LCD, the luminescent layer, the light filter layer and the at least one radiator so that no portion of the at least one radiator overlaps with the image display area; and (c) at least one processor operatively coupled to the LCD and the at least one radiator. The at least one processor is configured to control: (a) a see-through mode based on a first event to enable visible light to pass between the first and second environments; and (b) a background mode based on a second event so that the at least one radiator causes the luminescent layer to emit visible white light to illuminate the LCD, facilitating a display of one or more images toward the first environment.

In an embodiment, the electronic panel includes: (a) a front layer having a front surface positionable to face toward a first environment; and (b) an LCD located behind the front layer. The LCD is associated with an image display area. In addition, the electronic panel includes a lighting device located behind the LCD. The lighting device is see-through behind the image display area when the electronic panel is in a see-through mode. Also, the electronic panel includes: (a) a back layer having a back surface positionable to face toward a second environment; (b) a frame which supports the front layer, the back layer, the LCD and the lighting device; and (c) at least one processor operatively coupled to the LCD and the lighting device. The at least one processor is configured to control: (a) the see-through mode based on a first event to enable visible light to pass between the first and second environments while the lighting device is powered-off; and (b) a display mode based on a second event so that the lighting device generates visible white light to illuminate the LCD, facilitating a display of one or more images toward the first environment.

In an embodiment, the electronic panel includes: (a) a front layer having a front surface positionable to face toward a first environment; and (b) an LCD located behind the front layer. The LCD is associated with an image display area. Also, the electronic panel includes a luminescent layer located behind the LCD. The luminescent layer is transparent when not exposed to ultraviolet light. In addition, the electronic panel includes a light filter layer located behind the luminescent layer. The light filter layer has a back surface configured to face toward a second environment, and the light filter layer is configured to: (a) enable visible light from the second environment to pass through the light filter layer; and (b) prevent ultraviolet light from passing from the second environment through the light filter layer. The electronic panel also includes: (a) at least one radiator operable to radiate ultraviolet light; and (b) a frame which supports the front layer, the LCD, the at least one radiator and the light filter layer. The frame defines an opening sized at least as great as the image display area, and the frame supports the luminescent layer so that the luminescent layer entirely overlaps the image display area. The electronic panel includes at least one processor operatively coupled to the LCD and the at least one radiator. The at least one processor is operable to control a plurality of viewing modes including a blocking mode, a see-through mode and a background mode.

In the blocking mode, the at least one processor is operable to control the LCD to block the visible light from passing through the LCD, thereby preventing the blocked visible light from reaching the first environment. In the see-through mode, the at least one processor is operable to control the LCD to enable the visible light to pass from the second environment through the LCD, to the first environment. In the background mode, the at least one processor is operable to power the at least one radiator, causing the luminescent layer to absorb the ultraviolet light and emit visible light based on the absorbed ultraviolet light, wherein the emitted visible light includes a white light operable to illuminate the LCD.

Furthermore, the at least one processor is responsive to a plurality of inputs or commands, including: (a) a blocking command triggering the blocking mode; (b) a first display command causing the LCD to generate a first image during the see-through mode, in which event the first image is displayed so as to overlap any physical object in the second environment located behind the light filter layer; and (c) a second display command causing the LCD to generate a background image and a second image during the background mode. The white light illuminates the background image and the second image, and the second image is displayed against the background image.

Additional features and advantages of the present disclosure are described in, and will be apparent from, the following Brief Description of the Drawings and Detailed Description.

BRIEF DESCRIPTION OF THE DRAWINGS

FIG. 9 is a side elevation view of an embodiment of the electronic panel positioned in front of the poster of FIG. 8, illustrating the see-through mode.

FIG. 10 is a side elevation view of an embodiment of the electronic panel positioned in front of the poster of FIG. 8, illustrating the background mode.

FIG. 11 is a side elevation view of an embodiment of the electronic panel positioned in front of the poster of FIG. 8, illustrating the dual see-through and display mode.

DETAILED DESCRIPTION

Figure 1:
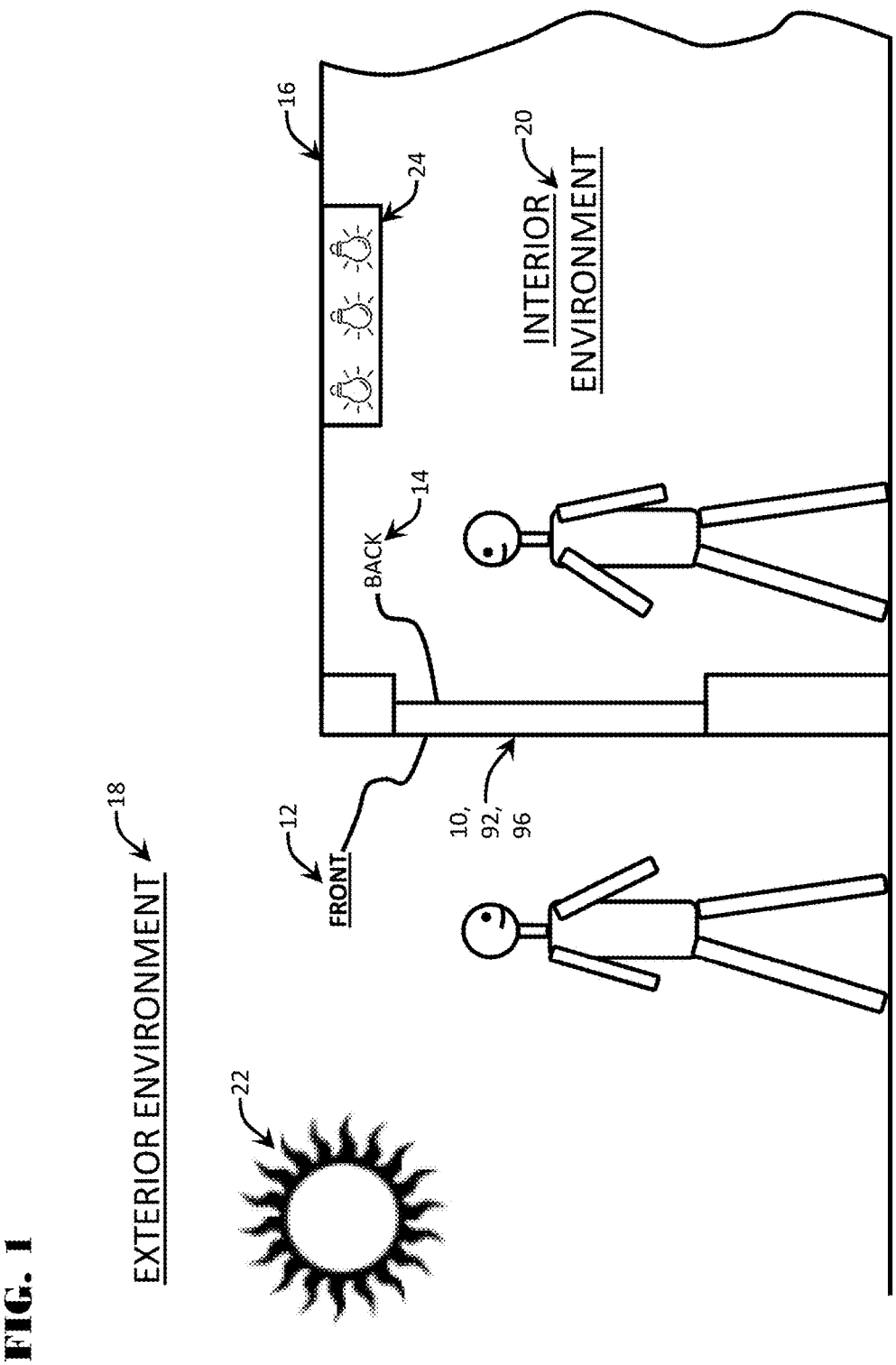
FIG. 1 is a side schematic view of an embodiment of the electronic panel installed in a building such that the panel front faces, and is exposed to, the exterior environment.
Figure 2:
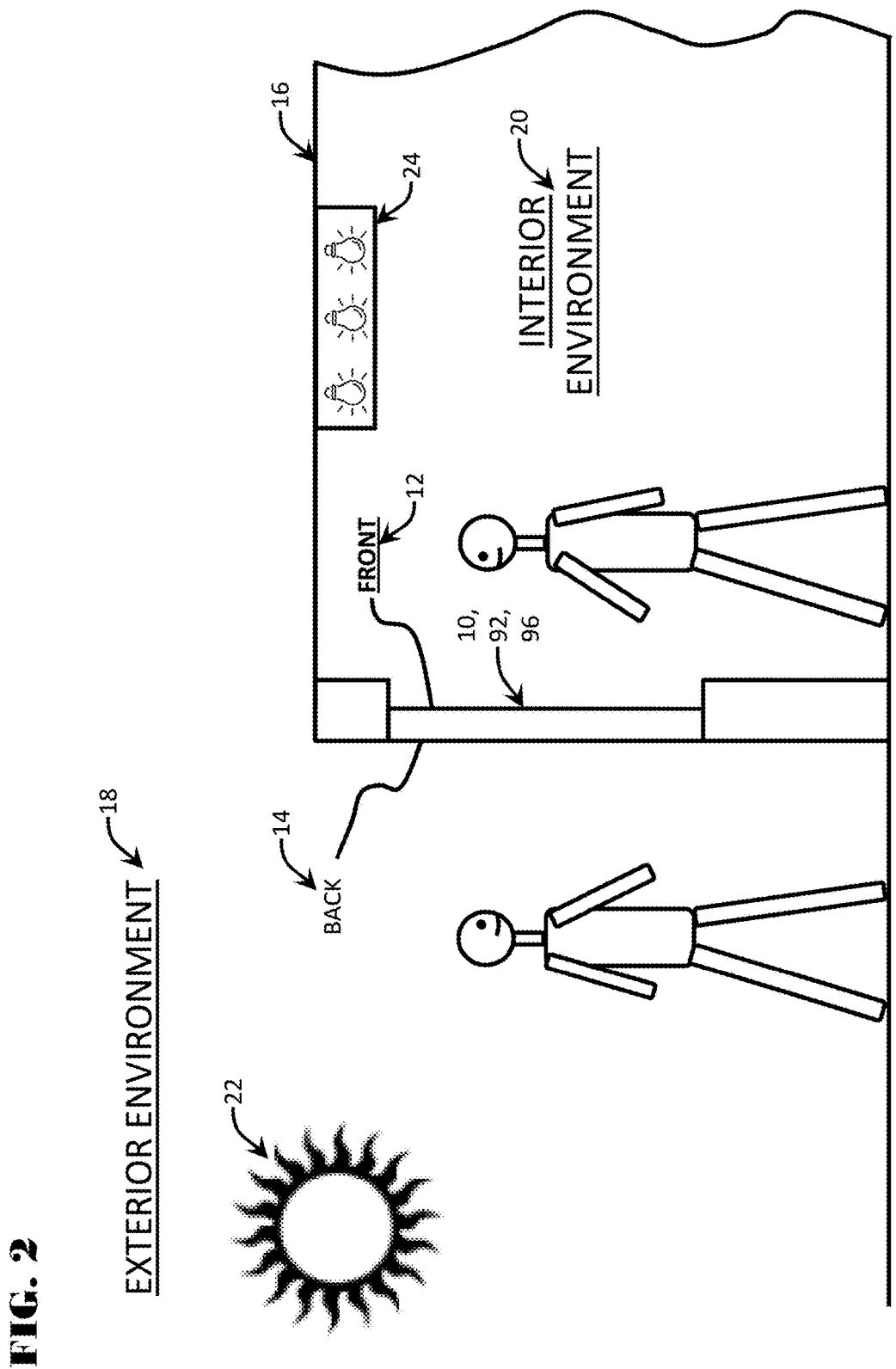
FIG. 2 is a side schematic view of an embodiment of the electronic panel installed in a building such that the panel front faces, and is exposed to, the interior environment of such building.

Referring to FIGS. 1-2, in an embodiment, the window device, display device or electronic panel 10 includes a panel front 12 and a panel back 14. An installer can mount the electronic panel 10 in a building 16 such that the panel front 12 faces, and is exposed to, the exterior environment 18 as illustrated in FIG. 1. Alternatively, the installer can mount the electronic panel 10 so that the panel front 12 faces, and is exposed to, the interior environment 20, as illustrated in FIG. 2. In the example shown, the exterior environment 18 includes visible light and non-visible light (e.g., ultraviolet light) radiated by the sun 22 and by artificial light sources in the exterior environment 18, such as outdoor lamps and vehicle lights. In this example, the interior environment 20 includes one or more light fixtures generating visible light, such as light fixture 24.

In one example, the building 16 with electronic panel 10 may be a street-level store front or a residential home. In operation, the electronic panel 10 illustrated in FIG. 1 serves as an electronic window. As described below, the electronic panel 10 is operable in a transparency or see-through mode to enable viewing through the electronic panel 10 as a window. The electronic panel 10 is also operable in other viewing modes for light blocking and image display purposes, including television functionality, as described below.

Figure 3:
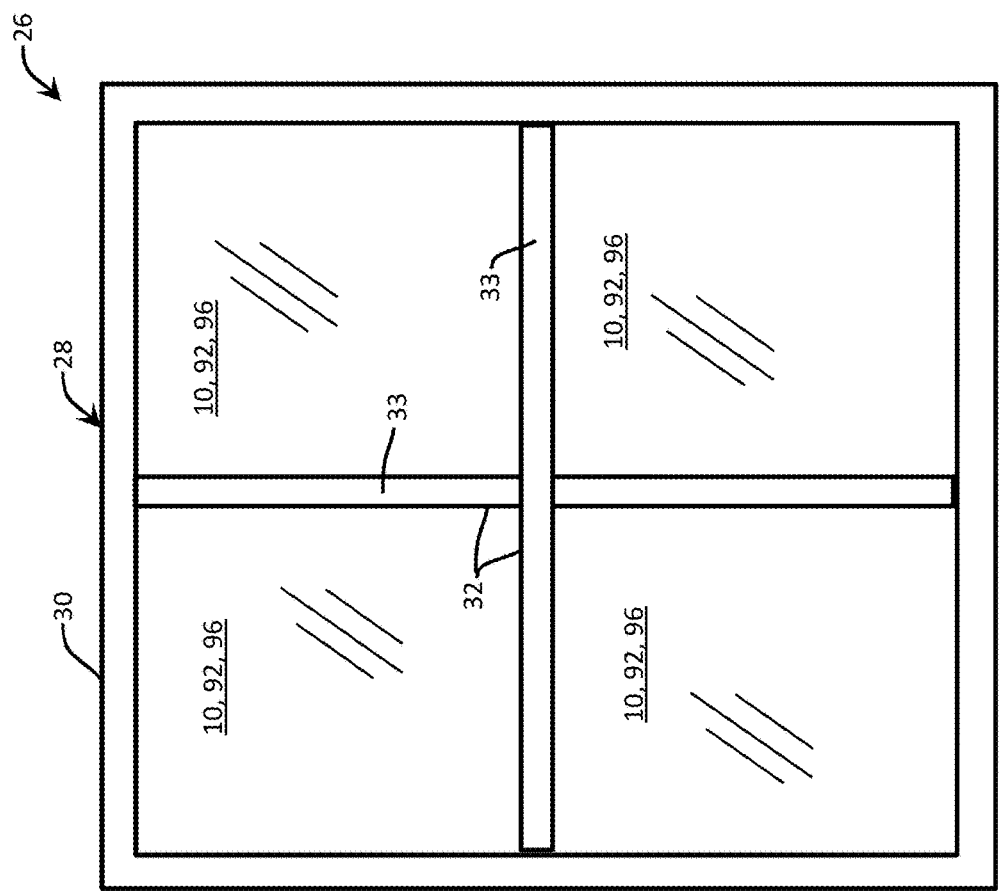
FIG. 3 is a side elevation view of an embodiment of an assembly of electronic panels.
Figure 7:
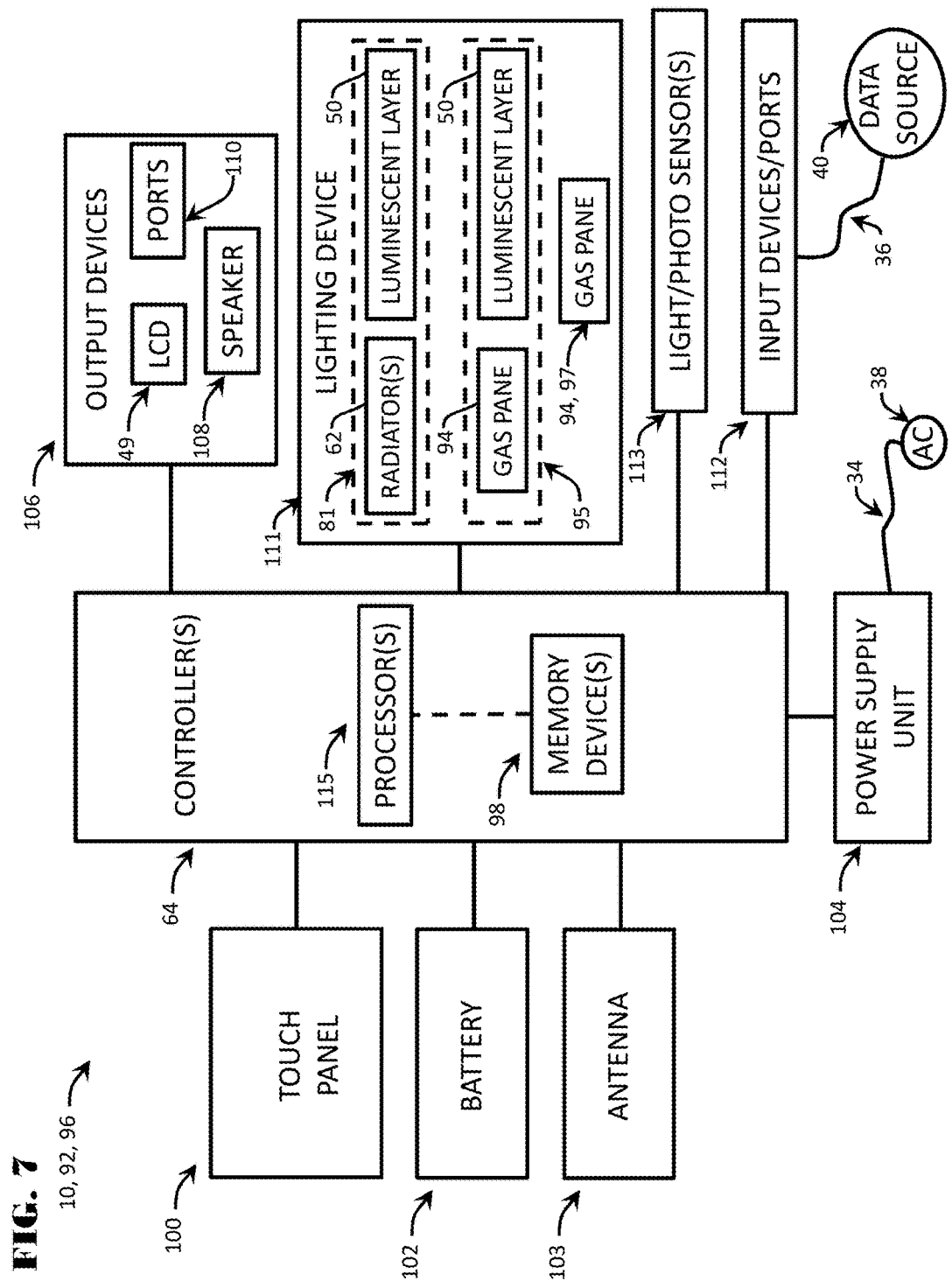
FIG. 7 is a schematic diagram illustrating an embodiment of the electronic configuration of the electronic panel.

As illustrated in FIG. 3, in an embodiment, the electronic panel assembly 26 includes: (a) a main frame 28 having a border structure 30 and a plurality of elongated dividers 32 defining a plurality of openings; and (b) a plurality of electronic panels 10 inserted into such openings and coupled to the dividers 32. Each divider 32 defines a passageway or channel 33. Each electronic panel 10 has an electrical power cable 34 (FIG. 7) and at least one data cable 36 (FIG. 7). In an embodiment, the cables 34 and 36 are configured to be inserted into the channels 33 defined by the dividers 32. The power cables 34 are then electrically connected to an alternating current (AC) power source 38 (FIG. 7) of the building 16. The data cables 36 are electrically connected to a data source 40 (FIG. 7). Depending upon the embodiment, the data source 40 can be a processor, computer, mobile computing device (e.g., a smartphone or tablet) or server located within the building 16.

In another example, the building 16 with electronic panel assembly 26 can be a high rise or skyscraper building with thousands of electronic panels 10 secured within numerous electronic panel assemblies 26. In operation, each electronic panel assembly 26 serves as an electronic window assembly configured for installation into the building 16. Based on the signals from the data source 40, the electronic panels 10 can synchronously operate, or each electronic panel 10 can operate independent of the other electronic panels 10.

For example, all of the electronic panels 10 on the side of a skyscraper building 16 can, as a whole, display a single, relatively large color image or video spanning across the electronic panels 10. In an embodiment, each electronic panel 10 can display a different image or different color.

Operable as large pixels of a digital screen, the colors of the electronic panels 10 can be separately controlled to generate a single, color image spanning across the electronic panels 10. The large color image can be of any type, including, but not limited to, a relatively large photograph, icon, company logo, product advertisement or government emergency alert symbol.

In another example, each one of the electronic panels 10 of the electronic panel assembly 26 is installed or located in a separate office of a relatively large commercial building 16. In any particular office, based on input signals from the office occupant, the electronic panel 10 can operate in a transparency or see-through mode to enable viewing through the panel 10 as a window. The electronic panel 10 is also operable in other viewing modes for light blocking and image display purposes as described below.

Figure 4:
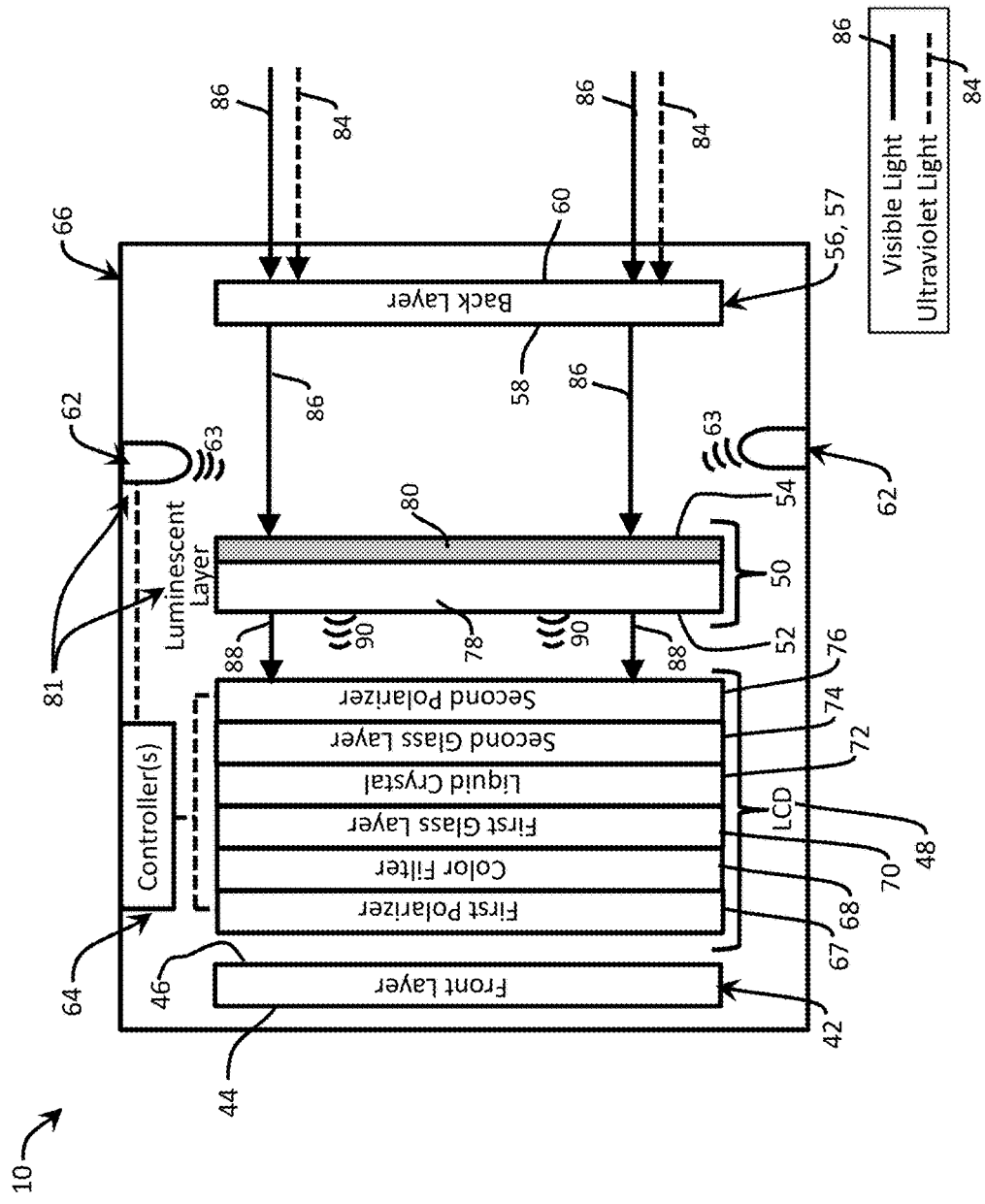
FIG. 4 is a side schematic view of an embodiment of the electronic panel in which the lighting device includes a luminescent layer and a plurality of radiators.

In an embodiment illustrated in FIG. 4, the display device or electronic panel 10 includes: (a) a front substrate or front layer 42 having a forward-facing surface 44 and a backward-facing surface 46; (b) an LCD 48 located behind the backward-facing surface 46; (c) an absorption substrate or luminescent layer 50 located behind the LCD 48, wherein the luminescent layer 50 has a forward-facing surface 52 and a backward-facing surface 54; (d) a back layer 56 located behind the luminescent layer 50, wherein the back layer 56 has a forward-facing surface 58 and a backward-facing surface 60; (e) a plurality of electromagnetic radiation generators or radiators 62; (f) at least one controller 64 operatively coupled to the LCD 48, radiators 62, AC 38 (FIG. 7) and data source 40 (FIG. 7); and (g) a panel housing, support or frame 66 configured to engage, hold and support the front layer 42, LCD 48, luminescent layer 50, back layer 56, radiators 62 and controller 64 in the stacking order illustrated in FIG. 4.

In an embodiment, the front layer 42 and back layer 56 each include a sheet of suitable glass. The glass is see-through. Depending upon the embodiment, the glass can be fully transparent, partially transparent, semi-transparent, tainted or translucent. In an embodiment, the glass includes an anti-glare coating to reduce glare. In an embodiment, the glass is tempered or shatter resistant for protection against environmental elements (e.g., wind, snow, hail, rain and earthquakes), strikes from objects (e.g., birds, balls and other projectiles) and vibration.

The LCD 48 can include any suitable, commercially-available LCD module. In an embodiment, the LCD 48 includes: (a) a first polarizer 67 located behind the backward facing surface 46 of the front layer 44; (b) a color filter 68 located behind the first polarizer 67; (c) a first glass layer 70 located behind the color filter 68; (d) a liquid crystal substance or liquid crystal layer 72 located behind the first glass layer 70; (f) a second glass layer 74 located behind the liquid crystal layer 72; and (g) a second polarizer 76 located behind the second glass layer 74.

The first and second glass layers 70 and 74 sandwich, and encase, the liquid crystal layer 72. The crystals in liquid crystal layer 72 contain molecules which tend to arrange themselves until they point in the same specific direction. Consequently, the crystals are responsive to electric current. Depending upon the electrical current, the crystals untwist to varying degrees to control the passage of light. The liquid crystal layer 72 is arranged in a grid of liquid crystal cells. Each cell corresponds to a pixel. Each pixel has three sub-pixels, one associated with the color red, one associated with the color green and one associated with the color blue.

The first and second polarizers 67 and 76 each includes an array of transparent electrodes. The color filter 68 is a passive, multi-colored film, including separate red, green and blue film areas for each pixel. The controller 64 is operatively coupled to the polarizers 67 and 76. In operation, the controller 64 causes the polarizers 67 and 76 to generated designated electrical currents. These electrical currents can cause: (a) one or more of the pixels to close, preventing the passage of light; (b) one or more of the pixels to open, enabling the passage of light; or (c) particular sub-pixels to enable the passage of light through the red, green or blue film areas of the color filter 68. Based on these electrical currents, the LCD 48 is operable to generate graphical images in color.

Figure 5:
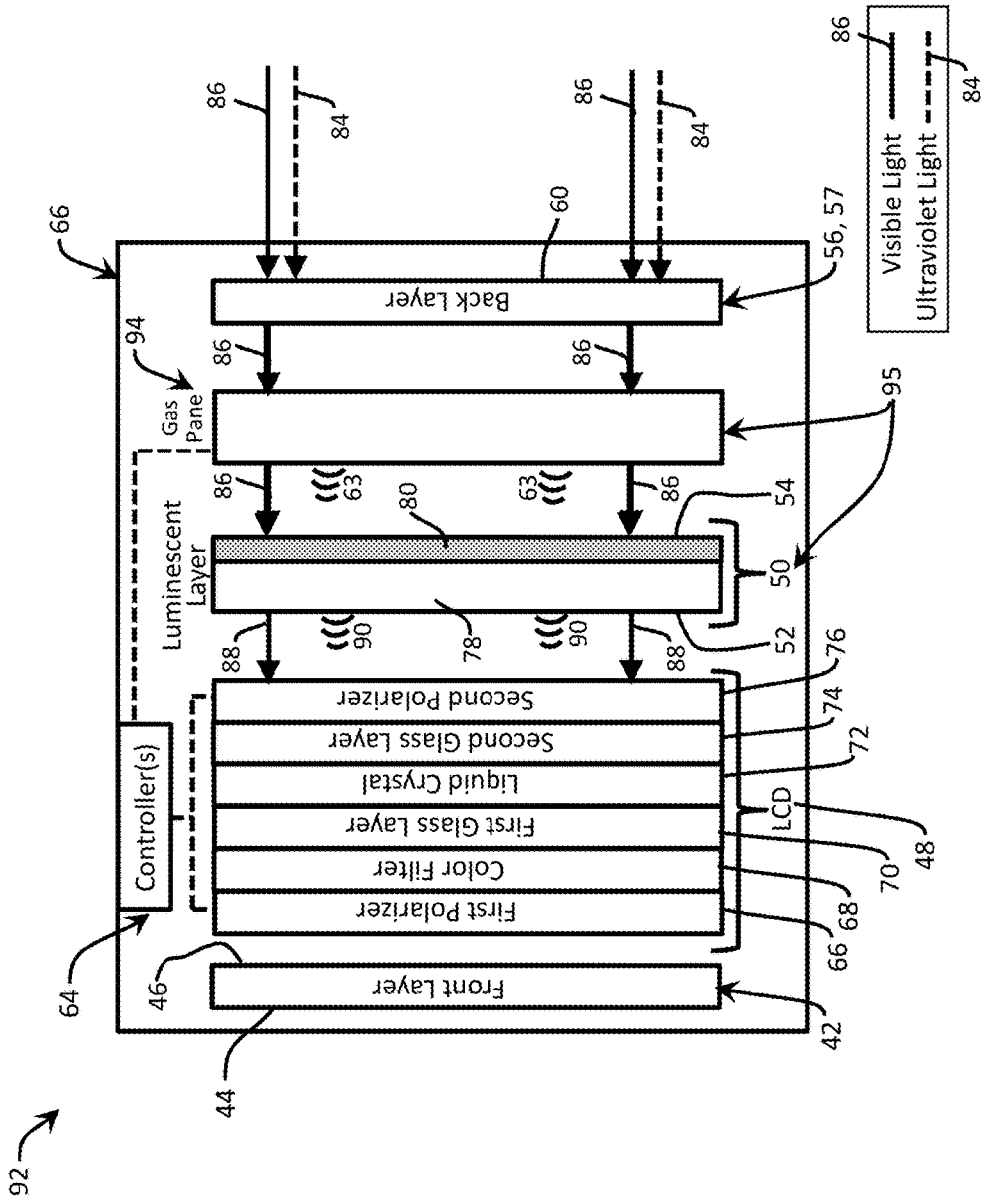
FIG. 5 is a side schematic view of an embodiment of the electronic panel in which the lighting device includes a luminescent layer and a gas pane.
Figure 6:
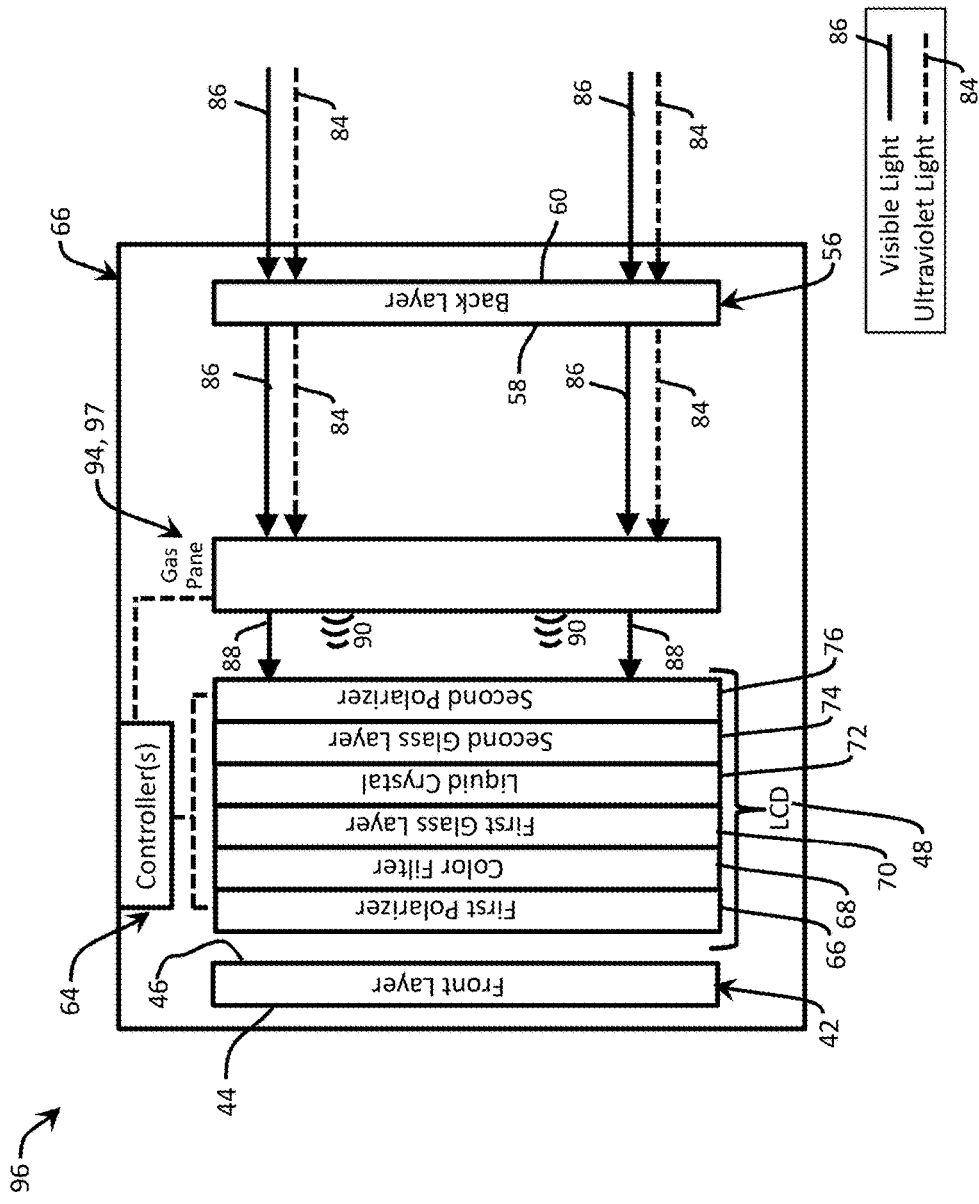
FIG. 6 is a side schematic view of an embodiment of the electronic panel in which the lighting device includes a gas pane.

It should be understood that the LCD 48 does not necessarily have to include the particular components and specific elements illustrated in FIGS. 4-6. For example, depending upon the embodiment, the LCD 48 can: (a) exclude one or more of the following elements: polarizers 67, 76, color filter 68 and glass layers 70, 74; (b) include alternative components which combine the functionalities of one or more of such elements; or (c) include additional components which play a role in achieving LCD functionality.

It should be appreciated that, in an embodiment, the liquid crystal layer 72 does not, by itself, emit light. To illuminate the LCD 48, a source of visible light (e.g., full-spectrum or white light) can be located behind the LCD 48. In an embodiment, the luminescent layer 50 functions as such source of visible light. The luminescent layer 50 includes: (a) a carrier substrate or carrier sub-layer 78; and (b) an absorption sub-layer or luminescent sub-layer 80 applied to or coated on the carrier sub-layer 78. The carrier sub-layer 78 is a suitable, clear or transparent glass substrate.

The luminescent sub-layer 80 includes an element or substance which emits visible light caused by activity other than heating of such substance. Depending upon the embodiment, such activity can include an absorption of photons, a chemical reaction, electrical activity, subatomic motion or stress on a molecule. In an embodiment, the luminescent sub-layer 80 includes a coating which incorporates a substance or material which is operable to absorb non-visible light, including, but not limited to, ultraviolet (UV) light and infrared (IR) light within the wavelength range of 1 μm to 10 nm.

In an embodiment, such coating or luminescent sub-layer 80 includes a fluorescent substance operable to generate visible light. The fluorescent substance has a characteristic associated with a relatively rapid rate of radiation absorption and a relatively rapid, instant or immediate release or emission of visible light. The fluorescent substance enables the luminescent sub-layer 80 to generate visible, white or full-spectrum light in the fashion sometimes described as the "glow-in-the-dark" phenomenon.

In an embodiment, as soon as the fluorescent substance is not exposed to the radiation generated by the radiators 62, the fluorescent substance exhibits a clear, transparent or see-through characteristic. For example, such fluorescent substance can be a clear liquid or a clear solid. During assembly, the assembler can apply the clear fluorescent liquid to the carrier sub-layer 78. When the fluorescent liquid dries, it establishes the luminescent sub-layer 80. As long as such luminescent sub-layer 80 is not exposed to UV light, such luminescent sub-layer 80 remains clear, transparent or see-through. When radiators 62 direct UV light toward such luminescent sub-layer 80, such luminescent sub-layer 80 emits visible, white light giving such luminescent sub-layer 80 a non-transparent or opaque characteristic. This white light has sufficient intensity to illuminate the LCD 48 for ease in viewing LCD-generated images as described below. As soon as radiators 62 are shut off, such luminescent sub-layer 80 stops emitting visible, white light, giving such luminescent sub-layer 80 a clear or transparent characteristic.

It should be understood that, in an embodiment, the fluorescent substance does not continue to glow and emit visible light after the radiation source has been turned off. Once the radiation source is turned off, the fluorescent substance stops glowing and converts from a white appearance to a clear, transparent or see-through appearance.

It should be appreciated that, in contrast to a phosphorous substance, the fluorescent substance quickly or instantly responds to the on/off modes of the radiators 62. The on-mode instantly causes the fluorescent substance to emit visible light, and the off-mode instantly causes the fluorescent substance to stop emitting visible light. For comparison purposes, phosphorous substance exhibits a relatively slow rate of radiation absorption and a relatively gradual, long release or emission of visible light for up to several hours after the original excitation has stopped.

In an embodiment, each radiator 62 includes an electromagnetic energy generator or radiation generator operable to generate non-visible light 63 operable to excite the luminescent layer 50. Depending upon the embodiment, the non-visible light 63 can include UV light or IR light. For example, the radiators 62 can include UV light sources or UV radiators, or the radiators 62 can include IR light sources or IR radiators. In an embodiment, each radiator 62 includes a UV light emitting diode (LED). In operation, the controller 64 turns on the radiators 62, and the radiators 62 direct or transmit radiation toward the luminescent sub-layer 80. In prompt or immediate response, the luminescent sub-layer 80 emits, outputs or generates visible, full-spectrum or white light. This white light illuminates the LCD 48 for image display purposes, as described below. After the controller 64 shuts off the radiators 62, the luminescent sub-layer 80 immediately loses its energy, stops generating the white light and converts to a clear, transparent or see-through medium.

In an embodiment, the radiators 62 and luminescent layer 50 cooperate as a lighting device 81 (FIGS. 4 and 7). As described above, the radiators 62 excite the luminescent layer 50. In response, the luminescent layer 50 generates visible, white light. Therefore, the lighting device 81 outputs this white light for purposes of backlighting the LCD 48.

Figure 8:
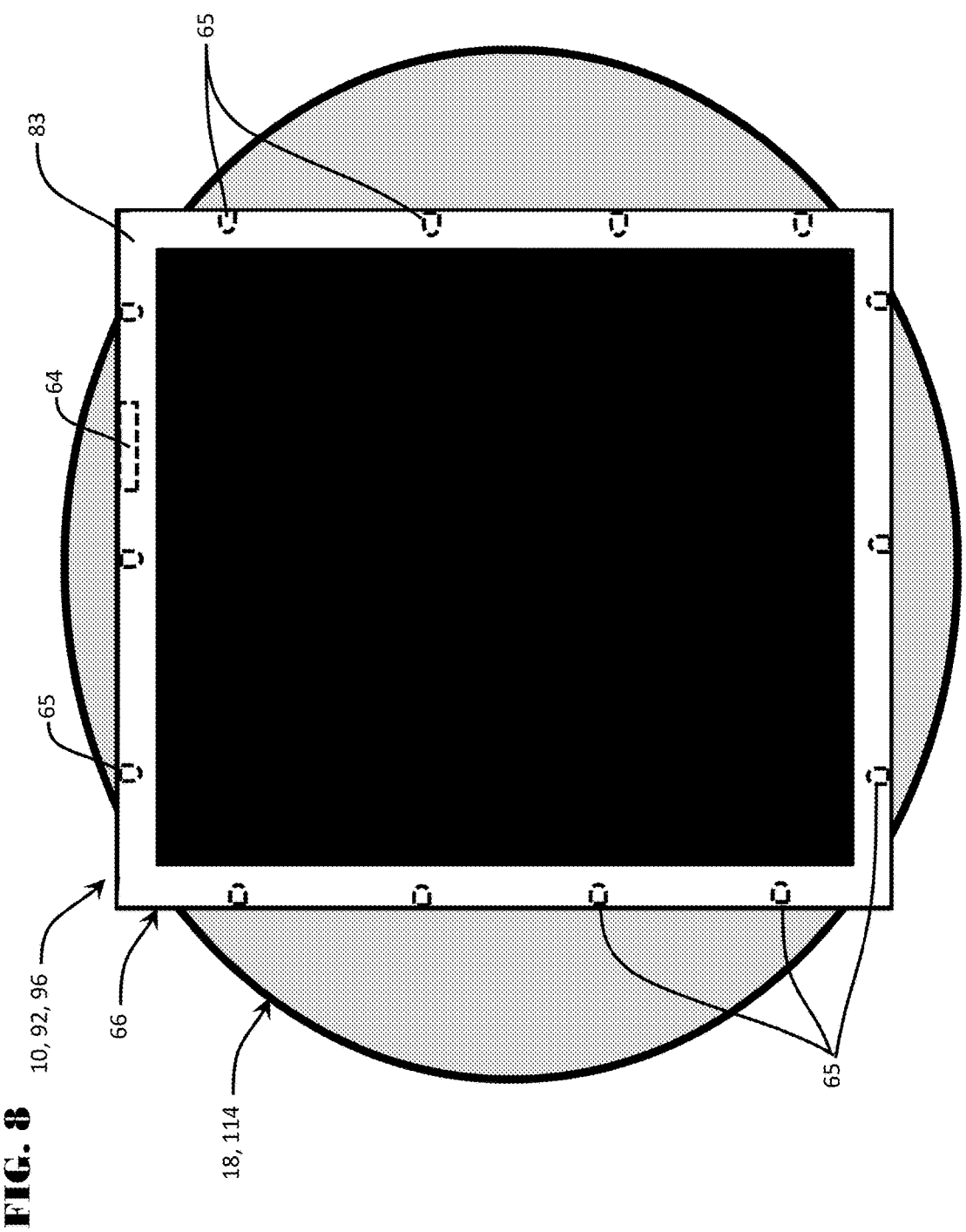
FIG. 8 is a side elevation view of an embodiment of the electronic panel positioned in front of a poster, illustrating the blocking mode.

In an embodiment illustrated in FIGS. 8-11, the frame 66 defines a frame channel or frame cavity 83. The controller 64 and radiators 62 are housed within the frame 66 and located in the frame cavity 83. As illustrated in FIGS. 4 and 8, the controller 64 and radiators 62 are mounted to the frame 66 so that such components are not in front of or behind any of the layers of the electronic panel 10. In other words, as illustrated in FIG. 9, the controller 64 and radiators 62 are not within the line of sight area, viewing area or image display area 85 defined by the inner frame sections 87 of the frame 66. Accordingly, when the electronic panel 10 is in see-through mode, the controller 64 and radiators 62 are not visible.

Referring again to FIG. 4, the back layer 56, in an embodiment, includes a light filter substrate 57 or light filter layer 57, serving a dual purpose. First, the light filter layer 57 acts as the panel back 14 to protect the internal components of the electronic panel 10. For example, the light filter layer 57 can include a sheet of suitable glass. Second, the light filter layer 57 screens-out, and blocks the entry of, invisible light which might otherwise excite the luminescent sub-layer 80. In an embodiment, the light filter layer 57 includes a UV screening medium operable to prevent UV light from passing through the light filter layer 57. In operation of such embodiment, the light filter layer 57 blocks the radiation wavelengths associated with UV light. The UV blockage enables the controller 64 to solely control the white light function of the luminescent sub-layer 80 without interference from the exterior environment 18 or interior environment 20, as applicable. The controller 64 can perform such sole control by controlling the on/off modes of the radiators 62.

For example, the operation of an embodiment of electronic panel 10 involves the following steps:
  (a) An installer installs the electronic panel 10 so that the panel front 12 faces the exterior environment 18 as illustrated in FIG. 1.
  (b) The light filter layer 57: (i) prevents the UV light 84 of the light fixtures 24 and interior environment 20 from traveling to the luminescent layer 50; and (ii) enables non-UV, visible light 86 to travel to, and reach, the luminescent layer 50.
  (c) If the radiators 62 are powered-off: (i) the luminescent layer 50 is transparent, and the non-UV, visible light 86 passes through the luminescent layer 50 as indicated by light path 88; (ii) such visible light 86 reaches the LCD 48 through light path 88; (iii) the pixel operation of LCD 48 controls whether such visible light 86 is blocked from passing through the LCD 48 or fully or partially passes through the LCD 48; and (iv) the front layer 42 enables any such passing, visible light 86 to exit through the panel front 12.
  (d) If the radiators 62 are powered-on: (i) the luminescent layer 50 is non-transparent, generating a visible, white light 90; (ii) the white light 90 and non-UV, visible light 86 collectively travel through light path 88 to reach the LCD 48; (iii) the LCD 48 generates images based on its pixel operation and the backlighting provided by the light 86 and 90 passing through light path 88; and (iv) the front layer 42 enables the image light to exit through the panel front 12 for viewing of the image.

In an embodiment illustrated in FIG. 5, the electronic panel 92 has the same structure, components, materials, functionality and logic of electronic panel 10 except that radiators 62 are removed and replaced with a gaseous illuminator or gas pane 94. The gas pane 94, in an embodiment, is a relatively shallow or thin box constructed of a plurality of clear, transparent or see-through layers, such as suitable sheets of glass. The perimeter edges of the gas pane 94 can be constructed of any suitable material, including, but not limited to, metal, plastic or glass materials having transparent or opaque characteristics. Also, the gas pane 94 includes: (a) an electrical gas exciter mounted to one or more of such perimeter edges; and (b) a suitable, clear, transparent or see-through gas which, when excited or electrically charged, generates UV light or a combination of UV light and visible light, including, but not limited to, white light. The gas exciter is mounted so as not to protrude into the image display area 85 (FIG. 9). As with the radiators 62, the controller 64 controls: (a) the on-mode of the gas pane 94 to generate non-visible light 63 (e.g., UV light) operable to excite the luminescent layer 50 for the purposes described above; and (b) the off-mode of the gas pane 94 to maintain the luminescent layer 50 in a non-excited state, in which the luminescent layer 50 is clear or transparent.

In an embodiment, the gas pane 94 and luminescent layer 50 cooperate as a lighting device 95 (FIGS. 5 and 7). As described above, the gas pane 94 excites the luminescent layer 50. In response, the luminescent layer 50 generates visible, white light. Therefore, the lighting device 95 outputs this white light for purposes of backlighting the LCD 48.

In an embodiment illustrated in FIG. 6, the electronic panel 96 has the same structure, components, materials, functionality and logic of electronic panel 92 except that: (a) the luminescent layer 50 is removed; and (b) the back layer 56 does not necessarily include the light filter layer 57. If the back layer 56 excludes the light filter layer 57, as shown, UV light 84 can pass through the back layer 56. In this embodiment, the gas pane 94 is configured and operable to generate visible, full-spectrum or white light with sufficient intensity to illuminate the LCD 48. Such intensity enables the LCD 48 to generate images which are easily viewable. The controller 64 controls: (a) the on-mode of the gas pane 94 to generate visible white light for purposes of providing backlight to the LCD 48; and (b) the off-mode of the gas pane 94 in which the gas pane 94 is clear, transparent or see-through.

In an embodiment, the gas pane 94 functions as a lighting device 97 (FIGS. 6 and 7). As described above, the gas pane 94, acting as lighting device 97, directly generates visible, white light. Therefore, the lighting device 97 outputs this white light for purposes of backlighting the LCD 48. This white light has sufficient intensity to illuminate the LCD 48 for ease in viewing LCD-generated images.

In an embodiment illustrated in FIG. 7, each of the electronic panels 10, 92 and 96 includes: (a) one or more controllers, such as controller 64; (b) a touch input device or touch panel 100 operatively coupled to the controller 64 to enable users to provide input signals to the controller 64 by touching the touch panel 100; (c) a rechargeable battery 102 electrically coupled to the controller 64 to provide a backup or alternate electrical energy source to the electronic panel 10, 92, 96; (d) one or more internal antennas, such as antenna 103, operatively coupled to the controller 64 to enable the controller 64 to wirelessly send and receive signals through radio frequency (RF) radiation, including, but not limited, to a Bluetooth® antenna module; (e) a power supply unit 104, electrically coupled to the controller 64, operable to receive AC 38 and transform it to direct current (DC) at a level suitable for the controller 64; (f) a plurality of output devices 106 operatively coupled to the controller 64, including, but not limited to, LCD 49, an audio output device or speaker 108 configured to generate sound, and a plurality of output data ports 110, including, but not limited, to an audio port; (g) a lighting device 111 (e.g., lighting device 81, 95 or 97) operatively coupled to the controller 64; (h) one or more photo sensors or light sensors, such as light sensor 113, operatively coupled to the controller 64 and operable to generate different control signals based on the amount of visible light present in the exterior environment 18 or interior environment 20; and (i) a plurality of input devices or input ports 112, operatively coupled to the controller 64 and operable to receive data or electronic signals from a data source 40 or from users.

In an embodiment, controller 64 includes: (a) one or more data processors, such as processor 115; and (b) one or more memory devices, such as memory device 98, operatively coupled to processor 115. Depending upon the embodiment, processor 115 can include one or more control circuits, microprocessors, central processing units (CPUs), integrated circuits, application-specific integrated circuits (ASICs), logic circuitry or other hardware circuit components configured to control the logic and operation of the system 10 by processing data or otherwise executing machine-readable instructions. Also, depending upon the embodiment, the memory device 98 can include one or more data storage devices or other data storage mediums configured to store machine-readable instructions, object code or other computer-readable code as well as data, data libraries and data sets.

Referring to FIGS. 8-11, in an embodiment, the frame 66 houses the controller 64 and one or more additional electronic components 65. Depending upon the embodiment, the additional electronic components 65 can include radiators 62, memory boards, wires or other electrical elements. To enable the see-through mode described below, the controller 64 and electronic components 65 are positioned inside the cavity 83 and outside of the image display area 85.

In an embodiment, electronic panel 10, 92, 96 is operable in a plurality of visibility or viewing modes controlled by the controller 64, including a shutter or blocking mode, a see-through mode, a background mode and a display mode. In the shutter or blocking mode illustrated in FIG. 8, the controller 64 causes the LCD 49 to orient its pixels so that they block the passage of light through the LCD 49. Accordingly, much like window shutters, blinds or curtains, the LCD 49 generates an opaque medium, such as black or gray, to prevent the transparency of the electronic panel 10, 92, 96. Referring to FIGS. 1 and 8, in the example shown, the electronic panel 10, 92, 96 is installed with its panel front 12 facing the exterior environment 18 and the panel back 14 facing the interior environment 20. In this example, the exterior environment 18 includes a physical poster 114 having a circular shape constructed of paper or plastic and painted with a smiley face. In this shutter or blocking mode, the electronic panel 10, 92, 96 blocks the portion of the poster 114 within the image display area 85 (FIG. 9) and prevents the entry of most or all visible light into the interior environment 20.

There are a plurality of different events which can trigger the shutter or blocking mode of the electronic panel 10, 92, 96 as illustrated in FIG. 8. In an embodiment, when the user desires privacy or darkness, the user can provide a blocking mode input using the touch panel 100, other input device 112 or an external device, such as a smartphone, operable to send a signal to the antenna 103. In another embodiment, the electronic panel 10, 92, 96 can be programmed to automatically activate the blocking mode when the light sensor 113 detects a diminished level of light from the exterior environment 18, such as the relatively low amount of visible light occurring in the evening or night. For example, when nightfall begins, electronic panel 10, 92, 96 automatically triggers the blocking mode so as to provide a home occupant or other building occupant with the expected privacy. A change to the blocking mode can be analogous to the closing of blinds or curtains in a building.

There are a plurality of different events which can trigger the transparency or see-through mode of the electronic panel 10, 92, 96 as illustrated in FIG. 9. Depending upon the embodiment, the see-through mode can cause the electronic panel 10, 92, 96 to exhibit transparent visibility, translucent visibility or any other suitable level of visibility in which visible light passes through the electronic panel 10, 92, 96. For example, the front layer 42 (FIG. 4) or light filter layer 57 (FIG. 4) can be tainted or treated with a tainting substance. Even with such tainting, visible light would pass through the electronic panel 10, 92, 96 during the see-through mode.

In an embodiment, when the user desires see-through visibility or viewing, the user can provide a see-through mode input using the touch panel 100, other input device 112 or an external device, such as a smartphone, operable to send a signal to the antenna 103. In another embodiment, the electronic panel 10, 92, 96 can be programmed to automatically initiate the see-through mode when the light sensor 113 detects an increased level of light from the exterior environment 18, such as the relatively high amount of visible light occurring in the morning or daytime. For example, when sunrise begins, electronic panel 10, 92, 96 automatically triggers the see-through mode so as to provide a home occupant or other building occupant with the desired natural light and visibility to the exterior environment 18. As shown in FIG. 9, the see-through mode reveals, and provides visibility to, the poster 114 located behind the image display area 85. A change to the see-through mode can be analogous to the opening of blinds or curtains in a building.

In the background mode illustrated in FIG. 10, the controller 64 is operable to radiate the luminescent layer 50, causing the luminescent layer 50 to absorb the radiation and emit visible, white light based on the absorbed radiation. Depending upon the embodiment, the controller 64 can achieve this by: (a) powering on the radiators 62 for the embodiment of electronic panel 10; (b) powering on the radiators 62 and exciting the gas in gas pane 94 for the embodiment of electronic panel 92; or (c) exciting the gas in gas pane 94 for the embodiment of electronic panel 96. In an embodiment, the radiation is UV light, and the emitted visible light includes a white light operable to illuminate LCD 48.

As shown, in the background mode the LCD 48 generates a desktop background image 116 which, in this example, is an opaque, white background covering the entire image display area 85. Depending upon the embodiment, the background image 116 can be white, blue or any other suitable color. In this background mode, the LCD 48 is operable to generate a graphical representation or image 118 viewable by the user. In this example, the image 118 is a motorcycle image viewable by building occupants inside the interior environment 20 (FIG. 1).

It should be understood that the desktop background image 116 can prevent physical objects, such as poster 114, from interfering with the visibility of images generated by the LCD 48, such as motorcycle image 118. For example, without background image 116, the poster 114 could possibly interfere with, or detract from, the full visibility of the image 118. In the example shown in FIG. 11, the motorcycle image 118 overlaps with the eye 120 of the poster 114. In this example, the motorcycle image 118 and eye 120 are both black in color. In this example, this black-on-black overlapping can make it difficult to visually determine whether the eye 120 is part of the cyclist's back image 122 generated by LCD 48. Depending upon the embodiment and display purpose, this difficulty can be a disadvantage when images 118 of one color are displayed in front of physical objects of the same or similar color. In an embodiment, the electronic panel 10, 92, 96 overcomes such disadvantage by generating the background image 116 in the background mode.

It should be appreciated, however, that in other embodiments, the electronic panel 10, 92, 96 is operable in a dual see-through and display mode. In such dual mode, the electronic panel 10, 92, 96 can advantageously generate images without requiring any background images 116. For example, if the eye 120 were yellow, the black motorcycle image 118 (including black back image 122) would be visibly and clearly distinguished from the images 118 and 122.

The blocking mode, see-through mode, background mode, and dual see-through and display mode are operable for the benefit of viewers in interior environments 20, as described above with respect to FIG. 1. For example, viewers in interior environments 20 can use the electronic panel 10, 92, 96 as a window with a blinding and un-blinding feature as well an image generation feature for watching images, videos and television programs. For an electronic panel 10, 92, 96 installed with its panel front 12 in an exterior environment 18 (FIG. 2), such modes are operable for the benefit of viewers in such exterior environments 18 as well as viewers in such interior environments 20. For example, viewers in interior environments 20 can use the electronic panel 10, 92, 96 as a window with a blinding and un-blinding feature. At the same time, such electronic panel 10, 92, 96 can display images, videos and television programs (e.g., advertisements and commercials) to viewers in the exterior environment 20.

Depending upon the embodiment, the electronic panel 10, 92, 96 can incorporate or embody a monitor, a screen, a display device, a television, an appliance, a communication device, a computer or any other apparatus operable to electronically generate or produce graphics, videos or other images. In an embodiment, such television includes all of the components of a commercially available, Internet-enabled television, including, but not limited to, a digital television (DTV) receiver, a tuner, a demodulator, an audio decoder, a video decoder, a program and system information (PSI) and system information protocol (PSIP) database and decoder, a channel map, and random access memory (RAM) or flash memory coupled to the channel map.

In an embodiment, such computer includes all of the components of a commercially available computer, including, but not limited to, a motherboard, CPU, read only memory (ROM), RAM, operating system, one or more data buses and a plurality of input/output (I/O) devices.

Referring back to FIG. 7, in an embodiment, the memory device 98 can be fully or partially incorporated into a database or server associated with the building 16, and the controller 64 can access such server over any suitable type of network. Depending upon the embodiment, the network can include one or more of the following: a wired network, a wireless network, a local area network (LAN), an extranet, an intranet, a wide area network (WAN) (including, but not limited to, the Internet), a virtual private network (VPN), an interconnected data path across which multiple devices may communicate, a peer-to-peer network, a telephone network, portions of a telecommunications network for sending data through a variety of different communication protocols, a Bluetooth communication network, a radio frequency (RF) data communication network, an infrared (IR) data communication network, a satellite communication network or a cellular communication network for sending and receiving data through short messaging service (SMS), multimedia messaging service (MMS), hypertext transfer protocol (HTTP), direct data connection, Wireless Application Protocol (WAP), email or any other suitable message transfer service or format.

In an embodiment, the memory device 98 can include one or more data storage devices, including, but not limited to, a hard drive with a spinning magnetic disk, a Solid-State Drive (SSD), a floppy disk, an optical disk (including, but not limited to, a CD or DVD), a RAM device, a ROM device (including, but not limited to, programmable read-only memory (PROM), electrically erasable programmable read-only memory (EPROM), electrically erasable programmable read-only memory (EEPROM)), a magnetic card, an optical card, a flash memory device (including, but not limited to, a USB key with non-volatile memory, any type of media suitable for storing electronic instructions or any other suitable type of computer-readable storage medium.

The touch panel 100, output devices 106 and input devices 112 of electronic panel 10, 92, 96 can incorporate the components of any device operable to communicate with the controller 64, including, but not limited to, the components of a personal computer (PC) (including, but not limited to, a desktop PC, a laptop or a tablet), smart television, Internet-enabled television, person digital assistant, smartphone, cellular phone or mobile communication device. In one embodiment, output devices 106 and input devices 112 have at least one input device (including, but not limited to, touchscreen or touch panel 100, a keyboard, a microphone, a sound sensor or a speech recognition device) and at least one output device (including, but not limited to, speaker 108 and LCD 49).

In an embodiment, the computer-readable instructions, algorithms and logic stored in memory device 98 or otherwise accessed by controller 64 are implemented with any suitable programming or scripting language, including, but not limited to, C, C++, Java, COBOL, assembler, PERL, Visual Basic, SQL Stored Procedures or Extensible Markup Language (XML). The system 10 can be implemented with any suitable combination of data structures, objects, processes, routines or other programming elements.

In an embodiment, the controller 64 is operable to generate a Graphical User Interface (GUI) structured based on a suitable programming language. The GUI can include, in an embodiment, multiple windows, pull-down menus, buttons, scroll bars, iconic images, wizards, the mouse symbol or pointer, and other suitable graphical elements. In one embodiment, the GUI incorporates multimedia, including, but not limited to, sound, voice, motion video and virtual reality interfaces to generate outputs of the electronic panel 10, 92, 96.

In an embodiment, the memory devices and data storage devices described above can be non-transitory mediums that store or participate in providing instructions to the controller 64 or another processor for execution. Such non-transitory mediums can take different forms, including, but not limited to, non-volatile media and volatile media. Non-volatile media can include, for example, optical or magnetic disks, flash drives, and any of the storage devices in any computer. Volatile media can include dynamic memory, such as main memory of a computer. Forms of non-transitory computer-readable media therefore include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read programming code and/or data. Many of these forms of computer readable media may be involved in carrying one or more sequences of one or more instructions to a processor for execution. In contrast with non-transitory mediums, transitory physical transmission media can include coaxial cables, copper wire and fiber optics, including the wires that comprise a bus within a computer system, a carrier wave transporting data or instructions, and cables or links transporting such a carrier wave. Carrier-wave transmission media can take the form of electric or electromagnetic signals, or acoustic or light waves such as those generated during RF and IR data communications.

In an embodiment, some of the components, parts and hardware of the electronic panel 10, 92, 96 are opaque. For example, the electronic panel 10, 92, 96 can include opaque circuit boards, memory boards and wires. In an embodiment, all portions of these opaque components are housed and located within the cavity 83 (FIG. 8) of the frame 66. Consequently, such components are not visible to viewers when the electronic panel 10, 92, 96 is operated in the see-through mode.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. An electronic panel comprising:
a front layer comprising a front surface positionable to face toward a first environment located opposite of a second environment;
a liquid crystal display device located behind the front layer, the liquid crystal display device being associated with an image display area within a perimeter;
an intermediate layer located behind the liquid crystal display device, the intermediate layer being see-through behind the image display area when the electronic panel is in a see-through mode, wherein the intermediate layer entirely overlaps the image display area, wherein the intermediate layer comprises a continuous medium that extends at least substantially to the perimeter;
at least one radiator configured to generate light;
a frame which supports the front layer, intermediate layer, the liquid crystal display device and the at least one radiator; and
at least one processor operatively coupled to the liquid crystal display device and the at least one radiator, wherein the at least one processor is programmed to control:
the see-through mode based on a first event to enable first visible light to pass between the first and second environments; and
a display mode based on a second event so that the at least one radiator generates the light, which causes the intermediate layer to provide second visible light to illuminate the liquid crystal display device, facilitating a display of one or more images toward the first environment.

2. The electronic panel of claim 1, wherein:
the intermediate layer and the at least one radiator are configured to cooperate as a lighting device; and
the intermediate layer is configured to be changed between a transparent condition and an opaque condition.

3. The electronic panel of claim 1, wherein all viewable images generated by the liquid crystal display device, under control of the at least one processor, are positioned within the image display area.

4. The electronic panel of claim 2, wherein the intermediate layer comprises: (a) a first sub-layer; and (b) a second sub-layer, wherein the second sub-layer comprises the continuous medium, wherein the continuous medium comprises a continuous liquid, wherein the continuous liquid comprises a uniform light transmission characteristic.

5. The electronic panel of claim 1, wherein the light generated by the at least one radiator is invisible light.

6. The electronic panel of claim 1, wherein the intermediate layer is a luminescent layer.

7. A window frame comprising the electronic panel of claim 1, wherein the frame is configured to be installed in a building.

8. An electronic panel comprising:
a front layer comprising a front surface positionable to face toward a first environment that is located opposite of a second environment;
a liquid crystal display device located behind the front layer, the liquid crystal display device being associated with an image display area within a display perimeter;
an intermediate layer located behind the liquid crystal display device, wherein the intermediate layer entirely overlaps the image display area, the intermediate layer comprising a continuous medium that extends at least substantially to the display perimeter;
at least one radiator configured to radiate light;
a frame which supports the intermediate layer, the liquid crystal display device, and the at least one radiator, the frame defining an opening sized at least as great as the image display area;
at least one processor operatively coupled to the liquid crystal display device and the at least one radiator, the at least one processor being programmed to control a plurality of viewing modes comprising a blocking mode, a see-through mode and a background mode;
wherein, in the blocking mode, the at least one processor is programmed to control the liquid crystal display device to block first visible light of the second environment from passing through the liquid crystal display device, thereby preventing the blocked first visible light from reaching the first environment;
wherein, in the see-through mode, the at least one processor is programmed to control the liquid crystal display device to enable the first visible light to pass from the second environment through the liquid crystal display device, to the first environment;
wherein, in the background mode, the at least one processor is programmed to control the at least one radiator, causing the intermediate layer to emit second visible light as a result of receiving light from the at least one radiator, wherein the emitted second visible light is sufficient to illuminate the liquid crystal display device;
wherein, the at least one processor is programmed to be responsive to a plurality of commands comprising:
a blocking command triggering the blocking mode;
a first display command causing the liquid crystal display device to generate a first image during the see-through mode, the first image being displayed so as to overlap any physical object in the second environment located behind the intermediate layer; and
a second display command causing the liquid crystal display device to generate a background image and a second image during the background mode, wherein:
(a) the second visible light illuminates the background image and the second image; and
(b) the second image is displayed against the background image.

9. A window frame comprising the electronic panel of claim 8, wherein:
the frame is configured to be installed in a building;
the intermediate layer comprises: (a) a first sub-layer; and (b) a second sub-layer supported by the first sub-layer, wherein the second sub-layer comprises a liquid; and
the continuous medium is free of zones comprising different degrees of light transmissivity in the see-through mode.

10. The electronic panel of claim 8, wherein:
the continuous medium comprises a liquid without gaps;
the liquid comprises a uniform light transmission characteristic when the electronic panel is in the see-through mode; and
all viewable images generated by the liquid crystal display device, under control of the at least one processor, are positioned within the image display area.

11. The electronic panel of claim 8, wherein the light radiated by the at least one radiator is invisible light.

12. An electronic panel comprising:
a front layer comprising a front surface positionable to face toward a first environment;
a liquid crystal display device located behind the front layer, the liquid crystal display device being associated with an image display area within a perimeter;
a first sub-layer located behind the liquid crystal display device;
a second sub-layer supported by the first sub-layer, wherein the second sub-layer entirely overlaps the image display area, wherein the second sub-layer comprises a continuous medium that extends at least substantially to the perimeter;
at least one radiator configured to provide light; and
a frame that supports the front layer, the liquid crystal display device, the first and second sub-layers, and the at least one radiator,
wherein the electronic panel comprises a see-through characteristic when the electronic panel is in a first mode, wherein the see-through characteristic is structured to pass first visible light from the first environment to a second environment located opposite of the first environment;
wherein the electronic panel comprises an image display characteristic when the electronic panel is in a second mode, wherein image display characteristic is based on second visible light provided by the second sub-layer, which is based on the light provided by the at least one radiator, wherein the second visible light is sufficient to illuminate the liquid crystal display device, facilitating a display of one or more images toward the first environment; and at least one processor operatively coupled to the liquid crystal display device, wherein the at least one processor is programmed to:

activate the see-through characteristic for the first mode; and activate the image display characteristic for the second mode.

13. The electronic panel of claim 12, wherein the light provided by the at least one radiator is invisible light.

14. The electronic panel of claim 12, wherein the at least one radiator and the second sub-layer are configured to cooperate to form a lighting device.

15. The electronic panel of claim 12, wherein the continuous medium comprises a liquid medium without gaps.

16. The electronic panel of claim 12, wherein the second sub-layer is a luminescent layer.

17. The electronic panel of claim 12, wherein the light provided by the at least one radiator is invisible light.

18. The electronic panel of claim 12, wherein, when the see-through characteristic is activated, the continuous medium is free of zones that have different degrees of light transmissivity.

19. The electronic panel of claim 12, wherein:

the perimeter comprises a plurality of sides;

when the see-through characteristic is activated, the continuous medium comprises a light transmissivity that is continuously uniform from one side of the perimeter to another side of the perimeter; and all viewable images generated by the liquid crystal display device, under control of the at least one processor, are positioned within the image display area.

20. A window frame comprising the electronic panel of claim 12, wherein:

the electronic panel comprises at least one cable operatively coupled to the processor;

the frame is configured to be installed in a building; and the frame defines at least one frame channel that is configured to receive the cable.

* * * * *